United States Patent
Paul et al.

(10) Patent No.: US 8,585,535 B2
(45) Date of Patent: Nov. 19, 2013

(54) HIGH TORQUE CAPACITY THREE OUTPUT DIFFERENTIAL

(75) Inventors: Surendar Shawn Paul, Farmington Hills, MI (US); Martin Hefter, Oxford, MI (US); Richard F. Olenzek, Farmington Hills, MI (US); Zinovy Soybel, West Bloomfield, MI (US); William J. Duncan, Jr., Wolverine Lake, MI (US); Alvan J. Callahan, Walled Lake, MI (US); David Louis Pieknik, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 749 days.

(21) Appl. No.: 12/543,299

(22) Filed: Aug. 18, 2009

(65) Prior Publication Data

US 2011/0045933 A1 Feb. 24, 2011

(51) Int. Cl.
*F16H 48/06* (2006.01)
(52) U.S. Cl.
USPC .......................................... 475/230; 74/606 R
(58) Field of Classification Search
USPC .......................................... 74/606 R; 475/230
See application file for complete search history.

(56) References Cited

U.S. PATENT DOCUMENTS

| 2,808,738 | A | * | 10/1957 | Bartell | 475/221 |
| 5,728,022 | A | * | 3/1998 | Schultz | 475/205 |
| 5,791,205 | A | | 8/1998 | Ruppert, Jr. | |
| 6,926,634 | B2 | | 8/2005 | Haka | |
| 6,942,592 | B1 | | 9/2005 | Haka | |
| 7,011,596 | B2 | | 3/2006 | Haka | |

FOREIGN PATENT DOCUMENTS

| DE | 1074351 A | 1/1960 |
| DE | 69917797 T2 | 6/2005 |
| DE | 102004034736 A1 | 2/2006 |
| DE | 60025487 T2 | 8/2006 |

* cited by examiner

*Primary Examiner* — David D Le
*Assistant Examiner* — Derek D Knight

(57) ABSTRACT

A differential for interconnecting an input member to a first, second, and third output member includes a housing interconnected with the input member and with the first output member, the housing having a first portion connected to a second portion, the first portion defining a first recess and the second portion defining a second recess, wherein the first recess and the second recess are aligned and cooperate to define a slot. A key member is disposed within the slot between the first portion and the second portion. A cross member is attached to the housing. A set of pinion gears is rotatable about the cross member. A set of side gears is intermeshed with the set of pinion gears, wherein one of the set of side gears is interconnected with the second output member and another of the set of side gears is interconnected with the third output member.

21 Claims, 3 Drawing Sheets

HIGH TORQUE CAPACITY THREE OUTPUT DIFFERENTIAL

FIELD

The invention relates generally to a high torque capacity three output differential, and more particularly to a high torque capacity three output differential having a two-piece housing with a torque carrying key.

BACKGROUND

The statements in this section merely provide background information related to the present disclosure and may or may not constitute prior art.

A typical driveline in a motor vehicle includes a transfer case or differential connected between the drive wheels of the motor vehicle and the engine and transmission. The differential is employed to distribute power from the transmission to each of the drive wheels. A typical differential includes an input member that rotates a housing and a plurality of side gears. One of the side gears is connected to a first half axle shaft and another is connected to a second half axle shaft. Each half axle shaft in turn is connected to a drive wheel. In addition, in a three output differential, the housing may be directly connected to a shaft member to distribute power to another set of drive wheels or to a power takeoff unit.

In three output differentials, the housing must be able to support the transfer of torque from the transmission to the second set of drive wheels or to the power takeoff unit. Traditionally, in order to have a high torque capacity, the housing of the differential must be one piece. Accordingly, there is room in the art for a high torque capacity differential that is easy to assemble and that reduces manufacturing costs.

SUMMARY

A differential for interconnecting an input member to a first, second, and third output member is provided. The differential includes a housing interconnected with the input member and with the first output member, the housing having a first portion connected to a second portion, the first portion defining a first recess and the second portion defining a second recess, wherein the first recess and the second recess are aligned and cooperate to define a slot. A key member is disposed within the slot between the first portion and the second portion, the key member rotationally coupling the first portion to the second portion. A cross member is attached to the housing. A set of pinion gears is disposed within the housing and rotatable about the cross member. A set of side gears is intermeshed with the set of pinion gears, wherein one of the set of side gears is interconnected with the second output member and another of the set of side gears is interconnected with the third output member.

In one aspect of the present invention, the first recess is located along an outer radial edge of the first portion at an end of the first portion and the second recess is located along an outer radial edge of the second portion at an end of the second portion facing the end of the first portion.

In another aspect of the present invention, the first recess includes a bottom wall, a face wall, and a pair of opposing side walls, wherein the second recess includes a bottom wall, a face wall, and a pair of opposing side walls, wherein the face wall of the first recess opposes the face wall of the second recess and the bottom wall of the first recess is substantially co-planar with the bottom wall of the second recess.

In yet another aspect of the present invention, the key member includes a first face, a second face, a third face, a fourth face, a bottom face, and a top face, wherein the first face is on an opposite side of the key member from the second face, the third face is on an opposite side of the key member from the fourth face, and the bottom face is on an opposite side of the key member from the top face.

In yet another aspect of the present invention, the key member is disposed within the slot such that the bottom face is parallel to the bottom walls of the first and second recesses, the first face is opposed to the face wall of the first recess, the second face is opposed to the face wall of the second recess, and the third and fourth walls are in selective contact with the opposing side walls of the first and second recesses.

In yet another aspect of the present invention, the face wall of the first recess defines an opening and the first face of the key member defines an opening that is aligned with the opening in the face wall of the first recess.

In yet another aspect of the present invention, the differential includes a pin having a first end disposed through the opening of the face wall of the first recess and disposed within the opening in the first face of the key member.

In yet another aspect of the present invention, the pin has a second end opposite the first end, the second end disposed within the first portion of the housing, and wherein the pin is disposed through the cross member in order to rotationally couple the cross member to the first portion of the housing.

In yet another aspect of the present invention, the input member, the first output member, the second output member, and the third output member are parallel to the pin.

In yet another aspect of the present invention, the differential includes a planetary gear set having a first member, a second member, and a third member, wherein the first member is coupled to the input member, the second member is coupled to the housing, and the third member is coupled to a stationary member.

In yet another aspect of the present invention, the first member is a sun gear, the second member is a carrier member, and the third member is a ring gear.

In yet another aspect of the present invention, the slot and the key member are each substantially square shaped.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
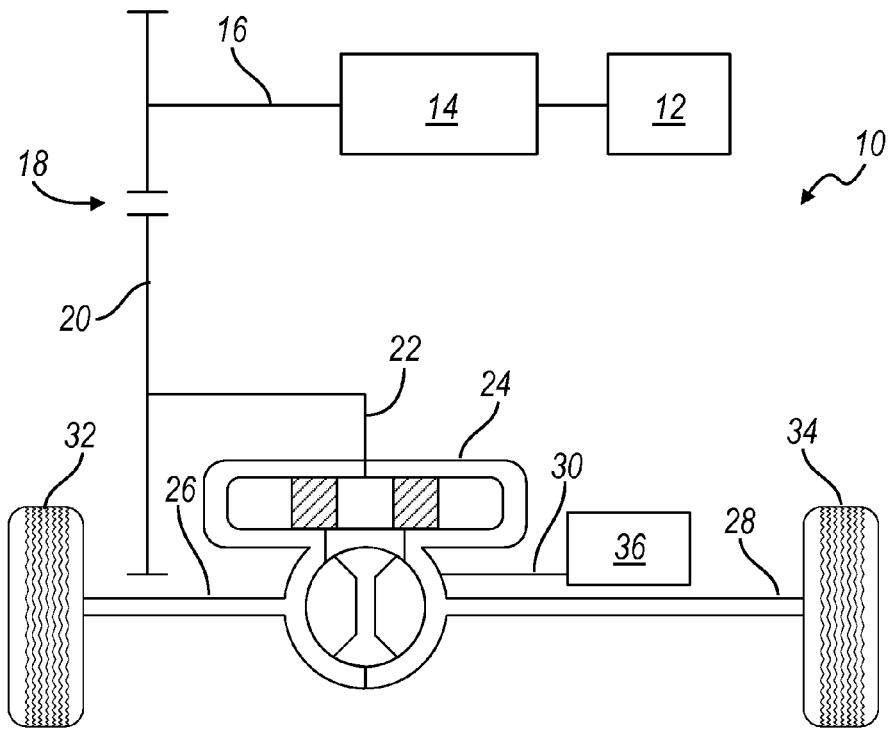
FIG. 1 is a schematic diagram of an exemplary powertrain of a motor vehicle according to the principles of the present invention.

With reference to FIG. 1, an exemplary powertrain for use in a motor vehicle is generally indicated by reference number 10. The powertrain 10 generally includes an engine 12 that provides an output torque to a transmission 14. The engine 12 may be any type of prime mover, such as a combustion engine, hybrid engine, or electric engine, without departing from the scope of the present invention. Likewise, the transmission 14 may take various forms, such as automatic or manual transmission having any number of gear sets for providing a plurality of forward and reverse gear ratios without departing from the scope of the present invention. The transmission 14 includes an output shaft or member 16 that is interconnected to a transfer mechanism 18. The transfer mechanism 18 is illustrated as a co-planar transfer gear 20 connected with an input shaft 22. However, it should be appreciated that the transfer mechanism 18 may take various forms, such as a direct connection between the output shaft of the transmission 16 and the input shaft 22, without departing from the scope of the present invention. The input shaft 22 is interconnected to a differential 24. The differential 24 is interconnected to a first member or half axle 26, a second member or half axle 28, and a third member 30, as will be described in greater detail below. The first half axle 26 is interconnected to a first drive wheel 32 and the second half axle 28 is interconnected to a second drive wheel 34. The third member 30 is interconnected to a power takeoff unit 36. The power takeoff unit 36 is operable to power auxiliary equipment through the engine 12. Alternatively, the power takeoff unit 36 may be replaced with a differential for powering another set of drive wheels (such as in a four wheel drive motor vehicle).

Figure 2:
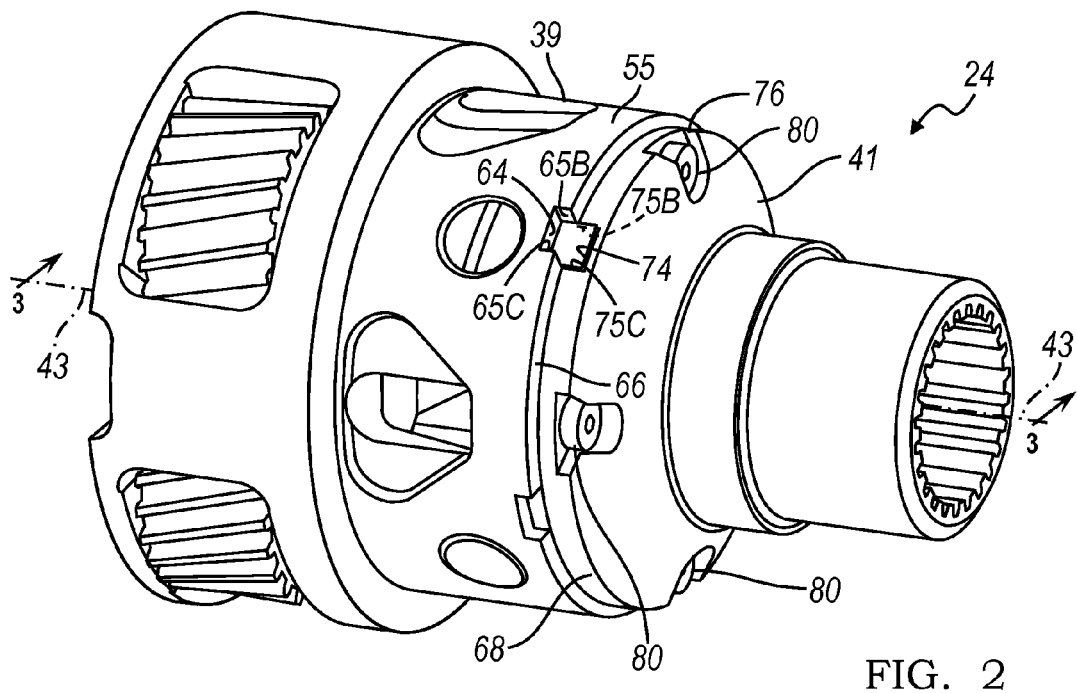
FIG. 2 is a perspective view of a high torque capacity differential according to the principles of the present invention.
Figure 3:
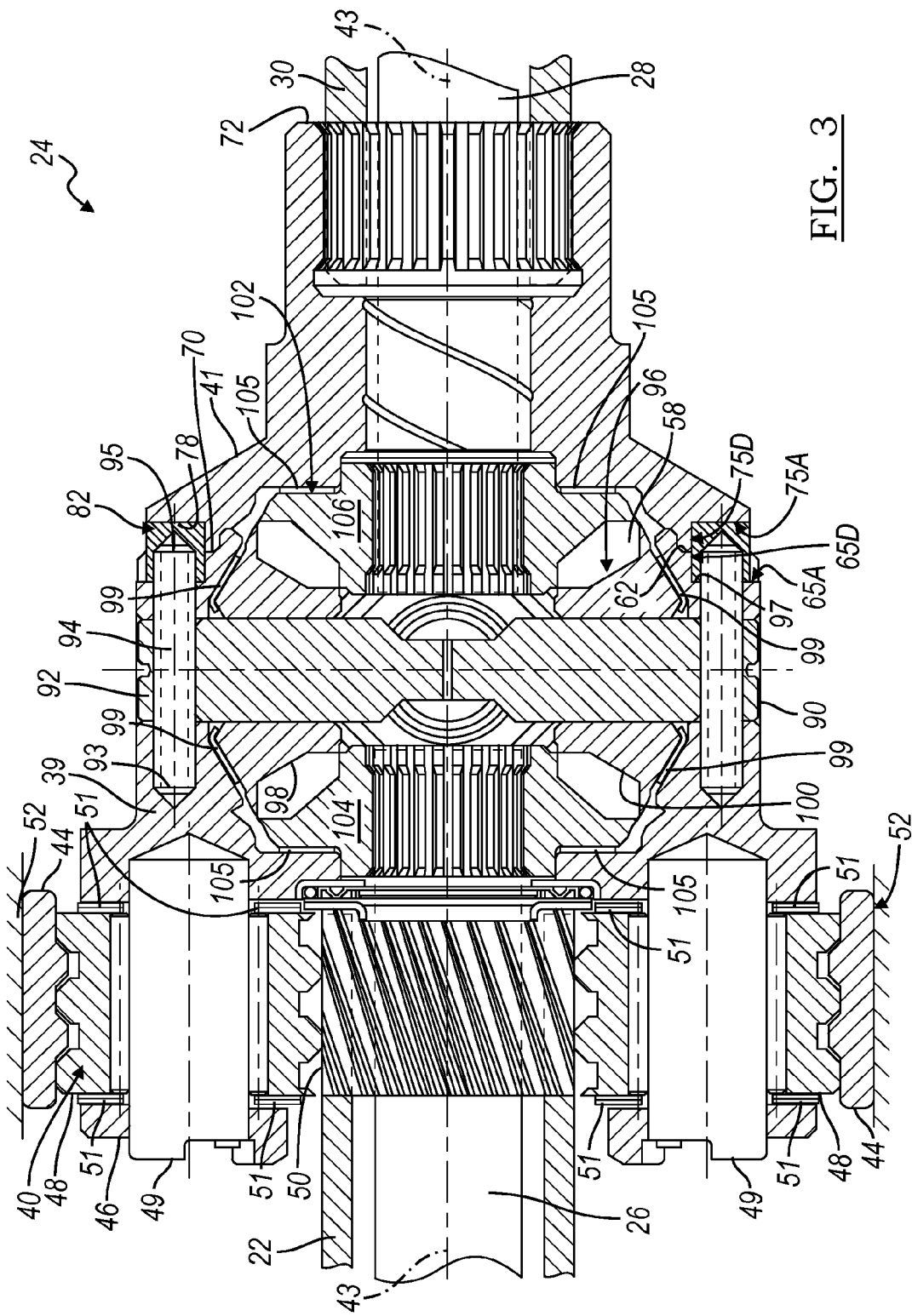
FIG. 3 is a cross-sectional view of the high torque capacity differential taken in the direction of arrow 3-3 in FIG. 2.

Turning to FIGS. 2 and 3, the differential 24 will now be described in greater detail. The differential 24 is operable to transfer the power from the input shaft 22 to the first half axle 26, the second half axle 28, and to the third member 30. The differential 24 includes a first housing portion 39 and a second housing portion or cover portion 41 that define an axis 43. A planetary gear set 40 is integrally formed within the housing portion 39. An end 46 of the housing portion 39 acts as a carrier member of the planetary gear set 40. The end 46 of the housing portion 39 rotatably supports a set of pinion gears 48 (only two of which are shown) supported on pins 49 secured to the housing portion 39. A ring gear member 44 (not shown in FIG. 2) and a sun gear member 50 are intermeshed with the pinion gears 48. A plurality of washers 51 are located between the pinion gears 48 and the end 46. The ring gear member 44 is connected for common rotation with a stationary element 52, such as a housing of a transmission of the motor vehicle. The sun gear member 50 is connected for common rotation with the input member 22. In an alternate embodiment, the ring gear member 44 is interconnected with the input member 22 and the sun gear member 50 is interconnected with the stationary member 52.

The housing portion 39 and the cover portion 41 are rotatable about the longitudinal axis 43. Each of the differential housing and cover portions 39, 41 are substantially annular. The differential housing and cover portions 39, 41 are coupled together and cooperate to define a cavity or space 58 within the differential 24. More specifically, the housing portion 39 has an outer surface 55 and includes the end 46 and a second end 62 opposite the end 46. The housing portion 39 also includes a key recess or slot 64 located in the outer surface 55 and proximate an outer radial edge 66 of the second end 62. The key recess 64 includes a face wall 65A, opposing side walls 65B and 65C, and a bottom wall 65D.

Likewise, the cover portion 41 has an outer surface 68 and includes a first end 70 and a second end 72 opposite the first end 70. The second end 72 is connected to the third member 30. The cover portion 41 also includes a key recess or slot 74 located in the outer surface 68 and proximate an outer radial edge 76 of the first end 70. The key recess 74 includes a face wall 75A, opposing side walls 75B and 75C, and a bottom wall 75D.

The housing portion 39 and the cover portion 41 are coupled together such that the second end 62 of the housing portion 39 abuts the first end 70 of the cover portion 41. Moreover, the housing and cover portions 39, 41 are radially aligned such that the key recess 64 of the housing portion 39 aligns with the key recess 74 of the cover portion 41 to form a substantially square key slot 78. As such, the face walls 65A and 75A are opposite one another and the bottom walls 65D and 75D are co-planar. In the example provided, there are two key recesses 64 on the housing portion 39 and two key recesses 74 on the cover portion 41 that define two key slots 78. However, it should be appreciated that any number of recesses and slots may be employed without departing from the scope of the present invention. In addition, the key slots 78 are located radially opposite one another, however, the position of the key slots 78 along the radial edges of the housing portion 39 and the cover portion 41 may vary without departing from the scope of the present invention. In the example provided, the housing portion 39 and the cover portion 41 are secured together via a plurality of screws 80, though it should be appreciated that any number of screws or other attachment devices may be employed without departing from the scope of the present invention.

Figure 4:
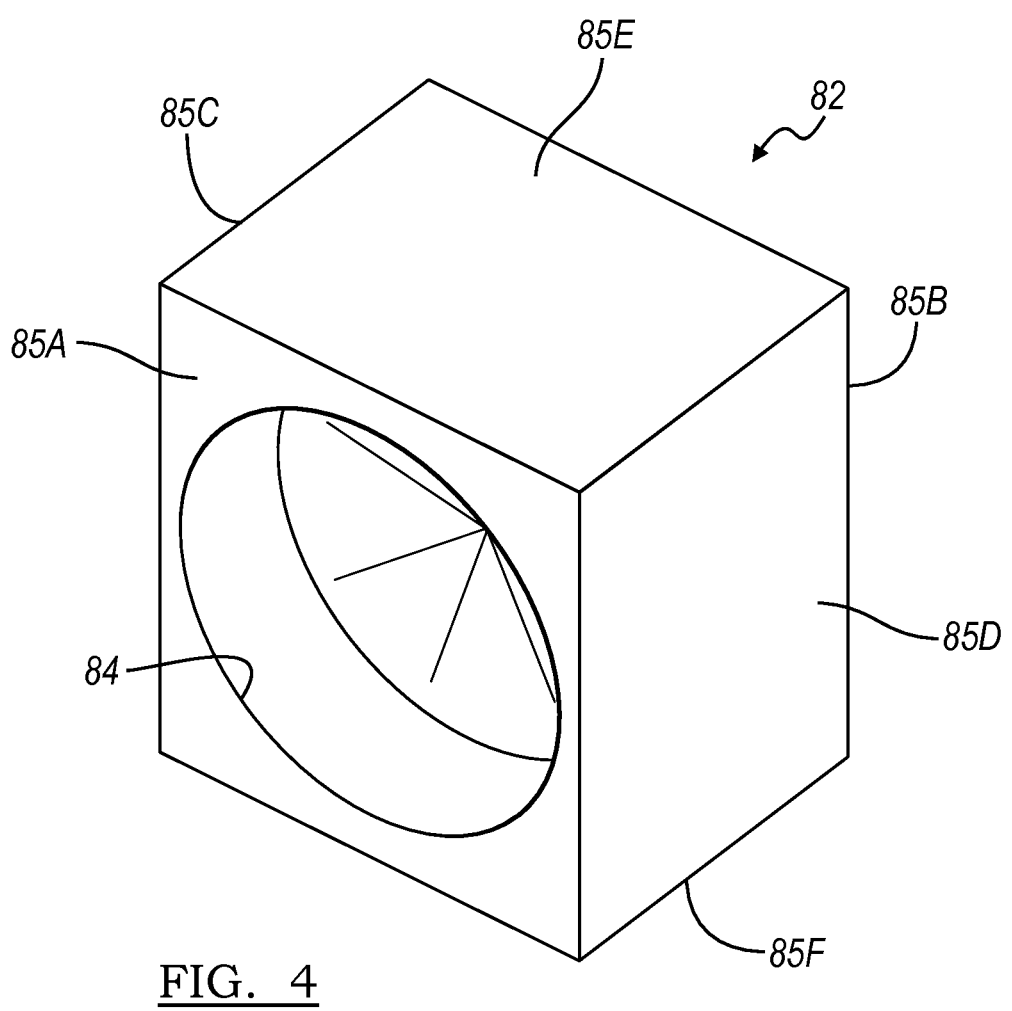
FIG. 4 is an enlarged perspective view of a key member used in the high torque capacity differential according to the principles of the present invention.

The differential 24 further includes at least one key 82 that is operable to transfer torque between the housing portion 39 and the cover portion 41, as will be described in greater detail below. The key 82 is sized to fit within the key slot 78 located between the housing and cover portions 39, 41. The key 82 includes a first face 85A, a second face 85B opposite the first face 85A, a third face 85C, a fourth face 85D opposite the third face 85C, a top face 85E, and a bottom face 85F opposite the top face 85E. As shown in FIG. 4, the key 82 has a substantially square shape. However, it should be appreciated that the key 82 may have any shape that effectively fits within the key slot 78 and is operable to contact the sides of the key slot 82. The key 82 further includes an opening or recess 84 located in the first face 85A.

Returning to FIGS. 2 and 3, the differential 24 also includes a cross shaft member 90 that extends radially through the cavity 58. The cross shaft member 90 includes distal ends 92 that are secured to the housing portion 39. A pair of pins 94 extend axially through each of the distal ends 92 and prevent the cross shaft member 90 from rotating. The pins 94 each include a first end 93 opposite a second end 95. In a preferred embodiment, the pins 94 extend from openings 97 in the face walls 65A of the recesses 64 of the housing portion 39 into the openings 84 of each of the keys 82. In an alternate embodiment, the key 82 may be secured to the housing portion 39 or the cover portion 41 by a snap ring that extends proximate the annular edges 66, 76 around the differential housing 42 or by a set screw within the key 82.

A set of gears 96 including a first bevel gear 98 and a second bevel gear 100 are secured to the cross shaft member 90. The first bevel gear 98 is located near one distal end 92 of the cross shaft member 90 within the cavity 58 and the second bevel gear 100 is located near the opposite distal end 92 of the cross shaft member 90 within the cavity 58. The set of gears 96 are secured to the cross shaft member 90 and therefore to the differential housing 42. A pair of spherical washers 99 are located between the set of gears 96 and the differential housing 42.

The differential 24 also includes a set of side gears 102 including a first side gear 104 and a second side gear 106. The first side gear 104 is located within the cavity 58 and is intermeshed with the set of gears 96. The second side gear 106 is also located within the cavity 58 and is intermeshed with the set of gears 96. A pair of washers 105 are located between the set of side gears 102 and the housing and cover portions 39, 41. The side gears 104, 106 are located on opposite sides of the set of gears 96. The first side gear 104 is coupled to and rotates the first half axle 26 and the second side gear 106 is coupled to and rotates the second half axle 28. The first half axle 26 extends axially through the housing portion 39, through the sun gear member 50 of the planetary gear set 40 and out of the differential 24. The second half axle 28 extends axially through the cover portion 41 and out the second end 72 of the cover portion 41. Accordingly, in the example provided, the input member 22 is a sleeve shaft concentric with the first half axle 26 and the third member 30 is a sleeve shaft concentric with the second half axle 28.

With combined reference to FIGS. 1-4, during operation, power or torque from the engine 12 is communicated to the sun gear member 50 of the differential 24 via the input member 22. The rotation of the sun gear member 50 in turn rotates the housing portion 39. The torque or power is transferred to the cover portion 41 through the keys 82 instead of the attachment screws 80. The cover portion 41 thereby rotates and transfers the power or torque to the third member 30. Simultaneously, rotation of the housing portion 39 and the cover portion 41 rotates the cross shaft member 90 and set of pinion gears 96 which in turn rotate the set of side gears 102. The set of side gears 102 rotate the first and second half axles 26, 28 to transfer the power or torque to the drive wheels 32, 34.

The description of the invention is merely exemplary in nature and variations that do not depart from the gist of the invention are intended to be within the scope of the invention. Such variations are not to be regarded as a departure from the spirit and scope of the invention.

We claim the following:

1. A differential for interconnecting an input member to a first, second, and third output member, the differential comprising:
   a housing interconnected with the input member and with the first output member, the housing having a first portion connected to a second portion, the first portion defining a first recess and the second portion defining a second recess, wherein the first recess and the second recess are aligned and cooperate to define a slot;
   a key member disposed within the slot between the first portion and the second portion, the key member rotationally coupling the first portion to the second portion;
   a cross member;
   a pin disposed through the cross member and coupled to the housing;
   a set of beveled gears disposed within the housing and rotatable about the cross member; and
   a set of side gears intermeshed with the set of beveled gears, wherein one of the set of side gears is interconnected with the second output member and another of the set of side gears is interconnected with the third output member.

2. The differential of claim 1 wherein the first recess is located along an outer radial edge of the first portion at an end of the first portion and the second recess is located along an outer radial edge of the second portion at an end of the second portion facing the end of the first portion.

3. The differential of claim 2 wherein the first recess includes a bottom wall, a face wall, and a pair of opposing side walls, wherein the second recess includes a bottom wall, a face wall, and a pair of opposing side walls, and wherein the face wall of the first recess opposes the face wall of the second recess and the bottom wall of the first recess is substantially co-planar with the bottom wall of the second recess.

4. The differential of claim 3 wherein the key member includes a first face, a second face, a third face, a fourth face, a bottom face, and a top face, wherein the first face is on an opposite side of the key member from the second face, the third face is on an opposite side of the key member from the fourth face, and the bottom face is on an opposite side of the key member from the top face.

5. The differential of claim 4 wherein the key member is disposed within the slot and the bottom face is parallel to the bottom walls of the first and second recesses, the first face is opposed to the face wall of the first recess, the second face is opposed to the face wall of the second recess, and the third and fourth walls are in selective contact with the opposing side walls of the first and second recesses.

6. The differential of claim 5 wherein the face wall of the first recess defines an opening and the first face of the key member defines an opening that is aligned with the opening in the face wall of the first recess.

7. The differential of claim 6 wherein the pin includes a first end disposed through the opening of the face wall of the first recess and disposed within the opening in the first face of the key member.

8. The differential of claim 7 wherein the pin has a second end opposite the first end, the second end disposed within the first portion of the housing, and wherein the pin is disposed through the cross member in order to rotationally couple the cross member to the first portion of the housing.

9. The differential of claim 8 wherein the input member, the first output member, the second output member, and the third output member are parallel to the pin.

10. The differential of claim 1 further comprising a planetary gear set having a first member, a second member, and a third member, wherein the first member is coupled to the input member, the second member is coupled to the housing, and the third member is coupled to a stationary member.

11. The differential of claim 10 wherein the first member is a sun gear, the second member is a carrier member, and the third member is a ring gear.

12. The differential of claim 1 wherein the slot and the key member are each substantially square shaped.

13. A differential for interconnecting an input member to a first, second, and third output member, the differential comprising:
   a planetary gear set having a first member, a second member, and a third member, wherein the first member is coupled to the input member and the third member is coupled to a stationary member;
   a housing comprising:
      a first portion interconnected with the second member of the planetary gear set, the first portion defining a first recess located along an outer radial edge of the first portion at an end of the first portion; and
      a second portion connected to the first portion, the second portion defining a second recess located along an outer radial edge of the second portion at an end of the second portion facing the end of the first portion, and wherein the first recess and the second recess are aligned and cooperate to define a slot;
   a key member disposed within the slot between the first portion and the second portion, the key member rotationally coupling the first portion to the second portion;
   a cross member;

a pin disposed through the cross member and coupled to the housing;

a set of beveled gears disposed within the housing and rotatable about the cross member; and a set of side gears intermeshed with the set of beveled gears, wherein one of the set of side gears is interconnected with the second output member and another of the set of side gears is interconnected with the third output member.

14. The differential of claim 13 wherein the first recess includes a bottom wall, a face wall, and a pair of opposing side walls, wherein the second recess includes a bottom wall, a face wall, and a pair of opposing side walls, and wherein the face wall of the first recess opposes the face wall of the second recess and the bottom wall of the first recess is substantially co-planar with the bottom wall of the second recess.

15. The differential of claim 14 wherein the key member includes a first face, a second face, a third face, a fourth face, a bottom face, and a top face, wherein the first face is on an opposite side of the key member from the second face, the third face is on an opposite side of the key member from the fourth face, and the bottom face is on an opposite side of the key member from the top face.

16. The differential of claim 15 wherein the key member is disposed within the slot such that the bottom face is parallel to the bottom walls of the first and second recesses, the first face is opposed to the face wall of the first recess, the second face is opposed to the face wall of the second recess, and the third and fourth walls are in selective contact with the opposing side walls of the first and second recesses.

17. The differential of claim 16 wherein the face wall of the first recess defines an opening and the first face of the key member defines a notch that is aligned with the opening in the face wall of the first recess.

18. The differential of claim 17 wherein the pin includes a first end disposed through the opening of the face wall of the first recess and disposed within the notch in the first face of the key member.

19. The differential of claim 18 wherein the pin has a second end opposite the first end, the second end disposed within the first portion of the housing, and wherein the pin is disposed through the cross member in order to rotationally couple the cross member to the first portion of the housing.

20. The differential of claim 19 wherein the input member, the first output member, the second output member, and the third output member are parallel to the pin.

21. The differential of claim 13 wherein the first member is a sun gear, the second member is a carrier member, and the third member is a ring gear.

* * * * *